(12) United States Patent
Alfredsson

(10) Patent No.: US 7,160,221 B2
(45) Date of Patent: Jan. 9, 2007

(54) GEARBOX FOR MOTOR VEHICLES

(75) Inventor: Sverker Alfredsson, Västra Frölunda (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 11/160,883

(22) Filed: Jul. 14, 2005

(65) Prior Publication Data
US 2006/0116234 A1    Jun. 1, 2006

Related U.S. Application Data

(63) Continuation of application No. PCT/SE04/000022, filed on Jan. 13, 2004, now abandoned.

(30) Foreign Application Priority Data
Jan. 14, 2003   (SE) .................................... 0300071

(51) Int. Cl.
*F16H 3/44* (2006.01)
(52) U.S. Cl. ...................... 475/303; 475/299
(58) Field of Classification Search ................ 475/204, 475/298, 299, 303, 317, 320, 321
See application file for complete search history.

(56) References Cited
U.S. PATENT DOCUMENTS

| 4,821,591 | A |  | 4/1989 | Adler |  |
|---|---|---|---|---|---|
| 4,976,671 | A | * | 12/1990 | Andersson | 475/299 |
| 5,006,100 | A | * | 4/1991 | Brandt et al. | 475/138 |
| 5,083,993 | A | * | 1/1992 | Oun | 475/299 |
| 5,643,129 | A | * | 7/1997 | Richardson | 475/204 |
| 6,022,289 | A |  | 2/2000 | Francis |  |
| 6,398,688 | B1 | * | 6/2002 | Brown et al. | 475/204 |
| 6,824,493 | B1 | * | 11/2004 | Alfredsson | 475/299 |
| 6,896,638 | B1 | * | 5/2005 | Nilsson | 475/299 |
| 6,984,188 | B1 | * | 1/2006 | Potter et al. | 475/298 |
| 2004/0106493 | A1 | * | 6/2004 | Alfredsson | 475/331 |

* cited by examiner

*Primary Examiner*—Roger Pang
(74) *Attorney, Agent, or Firm*—Novak Druce & Quigg, LLP

(57) ABSTRACT

Method and arrangement for providing a range gearbox with planetary gear (1) for motor vehicles, intended to be connected to the output side of a basic gearbox. The ring gear (18) of the planetary gear is axially displaceable. The ring gear (18) can engage coupling rings (10, 16) alternatively. A synchronizing means (15) is intended to synchronize the rotational speed difference between the ring gear (18) and at least the coupling ring (16). The synchronizing means (15) and the coupling ring (16) are arranged coaxially outside the ring gear (18). A second means (25) for engaging the coupling ring (16) and a third means (25, 25*b*) for driving the synchronizing means (15) are arranged on the external side, seen radially, of the ring gear (18), and the synchronizing means (15) is arranged between the coupling ring (16) and the first means (27) for axial displacement of the ring gear (18).

16 Claims, 3 Drawing Sheets

GEARBOX FOR MOTOR VEHICLES

CROSS-REFERENCE TO RELATED APPLICATIONS

The present application is a continuation patent application of International Application No. PCT/SE2004/000022 filed 13 Jan. 2004 now abandoned which was published in English pursuant to Article 21(2) of the Patent Cooperation Treaty, and which claims priority to Swedish Application No. 0300071-8 filed 14 Jan. 2003. Said applications are expressly incorporated herein by reference in their entireties.

FIELD OF THE INVENTION

The present invention relates to a gearbox for motor vehicles, which is arranged between a basic gearbox and a transmission leading to driving wheels, and in which the gearbox is intended to be capable of shifting between two gearings and thus, together with the basic gearbox, doubling the total number of gearing possibilities.

BACKGROUND OF THE INVENTION

In transmission systems for heavy-duty vehicles, for example trucks and buses, it is known to connect an extra gearbox to the basic gearbox of the vehicle for the purpose of doubling the number of gearing possibilities (see, for example, U.S. Pat. No. 4,821,591 or WO 9620359). Such a gearbox is usually referred to as a range gearbox or an auxiliary gearbox. The range gearbox usually comprises (includes, but is not necessarily limited to) a planetary gear, by means of which the gearing can be changed between a high-range mode and a low-range mode. In the low-range mode, use is made of the gearing in the planetary gear, whereas, in the high-range mode, no transmission takes place through the planetary gear. In order to facilitate shifting between high-range mode and low-range mode, it is known to design such planetary gears with synchronizing means, usually comprising synchronizing rings, spring means for pre-synchronizing and blocking means in order to prevent engagement before synchronous rotational speed has been achieved.

In order to reduce the number of component parts and also from the point of view of power distribution, it has been found to be advantageous to use the ring gear of the planetary gear as a coupling sleeve. The ring gear can, by axial displacement and after synchronization of the rotational speed difference between the ring gear and coupling rings, be brought into engagement with the coupling ring concerned on either side of the planetary gear, and, in this way, different gearings are obtained. Examples of known designs having an axially displaceable ring gear are shown in WO0155620. In this case, the ring gear is provided at each axial end with synchronizing means, and the internal teeth of the ring gear are extended so as to be capable of being coupled together with a corresponding coupling ring with coupling teeth arranged on each side of the ring gear. The ring gear and the synchronizing means on each side thus occupy more space in the axial direction.

When the ring gear in WO0155620 is coupled together with the gearbox casing, low-range mode is obtained and the gearing in the planetary gear is used.

In order to obtain a shorter shifting time when synchronizing the rotational speed for the low-range mode, a greater synchronizing torque is required compared with synchronization for the high-range mode. A large low-range synchronization diameter is thus desirable in order to obtain a greater synchronizing torque. The diameter refers to the position of the synchronizing friction surfaces. In the range gearbox according to WO0155620, the inside diameter of the ring gear limits the possibility of a large synchronizing diameter and thus a great synchronizing torque. Another disadvantage of known art is that the overall length is in many cases too great.

SUMMARY OF THE INVENTION

An object of the present invention is to make synchronization for the low-range mode act on as large a diameter as possible in order to obtain more rapid shifts and also to shorten the overall length of the gearbox, while at the same time retaining good functioning. A further object is to reduce friction losses from axial displacement of the ring gear when high range is engaged by separating friction surfaces in the synchronizing device for low range.

Consequently, arrangements conforming with the teachings of the present invention include a gearbox for a motor vehicle that is configured to be connected to the output side of a basic gearbox by an input shaft therefrom. An output shaft is provided from the gearbox to a transmission, and a planetary gear is arranged between the input shaft and the output shaft. The ring gear of the planetary gear is configured to be axially displaced by a first means for axial displacement of the ring gear.

The arrangement also includes a first coupling ring, for engaging a high-range mode, and a second coupling ring for engaging a low-range mode. The coupling rings and the ring gear can be alternatively engaged. At least one synchronizing means having at least one friction surface is provided that is configured to synchronize a rotational speed difference between the ring gear and one or the other coupling ring by interaction with a corresponding friction surface arranged on the respective coupling ring. The synchronizing means and the second coupling ring are arranged coaxially outside the ring gear. A second means for engaging the second coupling ring and a third means for driving the synchronizing means are arranged on the external side of the ring gear, as seen radially, and the synchronizing means is arranged between the second coupling ring and the first means.

The following important advantages are achieved through the use of such an inventive arrangement. The shifting time, when shifting to a low-range gear, is shortened considerably. The shorter shifting time is achieved on account of the greater synchronizing torque which is obtained by virtue of the invention making it possible to arrange the friction surfaces of the synchronizing ring along a larger diameter, seen from the center line of the input and output shafts, that is to say the synchronizing ring is located coaxially outside the ring gear. Moreover, the overall length of the range gearbox is shortened further, and the space behind the second coupling ring becomes free and can be used for an auxiliary brake, for example a hydrodynamic retarder.

According to an advantageous first embodiment of the arrangement according to the invention, the internal teeth, seen radially, of the ring gear are used for engaging the first coupling ring, which results in short overall length and simple manufacture of the first coupling ring.

In a further advantageous second embodiment of the arrangement according to the invention, the internal teeth of the ring gear are helical teeth. The advantage of this is that a servo effect is obtained when the gear concerned is engaged. The helical teeth moreover provide quieter operation.

BRIEF DESCRIPTION OF THE DRAWINGS

The present invention will be described in greater detail below with reference to the accompanying drawings which, for the purpose of exemplification, show preferred embodiments of the invention and also the technical background.

DESCRIPTION OF PREFERRED EMBODIMENTS OF THE INVENTION

Figure 1:
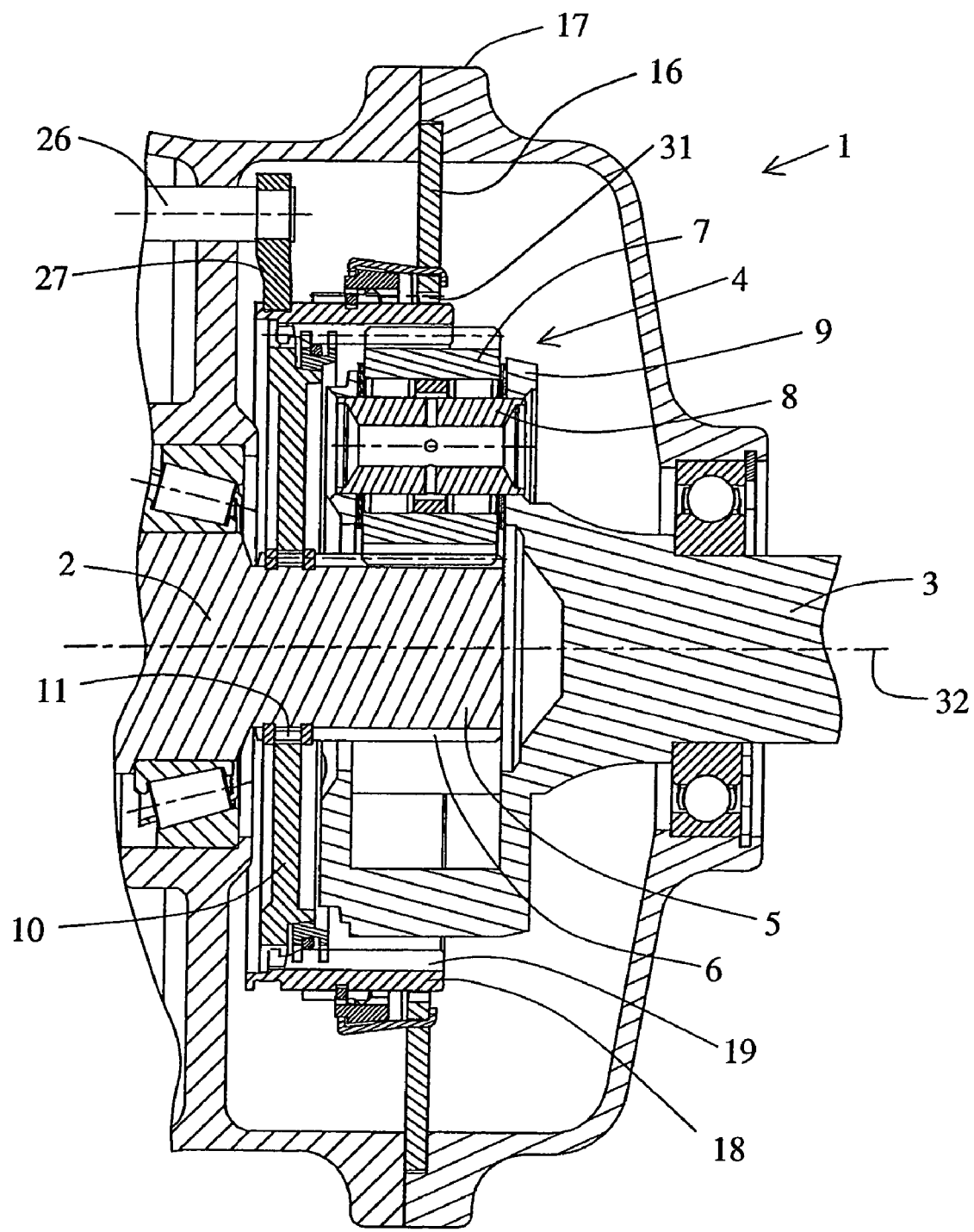
FIG. 1 is a cross-sectional view showing a longitudinal section taken through a range gearbox configured according to an embodiment of the present invention and in which the high-range mode (direct gear) is engaged.
Figure 2:
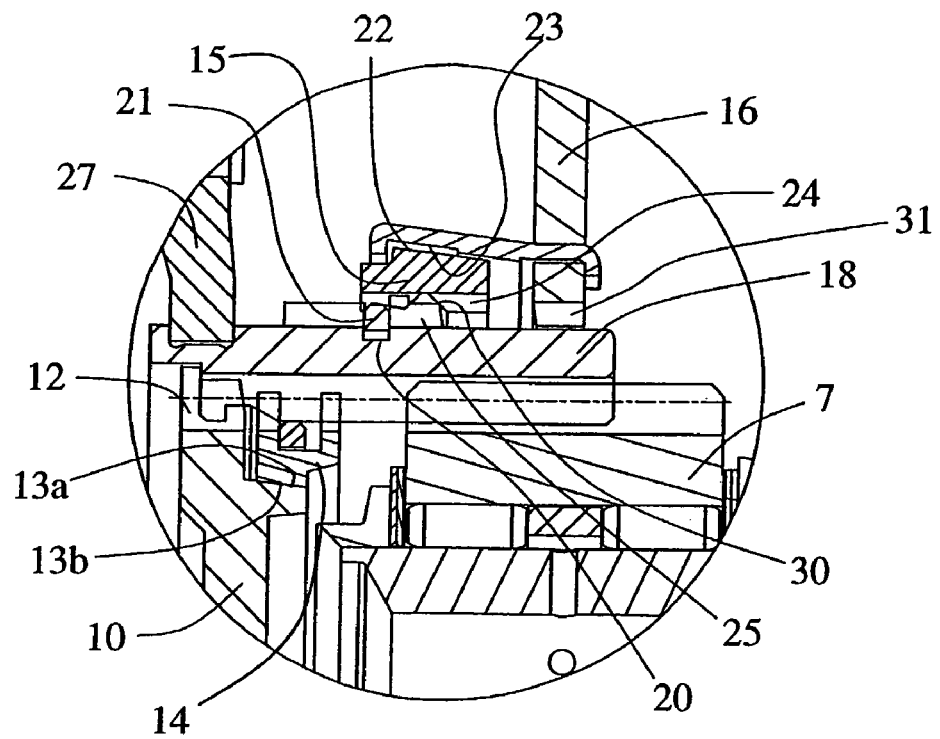
FIG. 2 shows an enlargement of part of the arrangement of FIG. 1.

FIG. 1 shows a gearbox 1 configured according to the invention and which advantageously forms a range gearbox 1 intended to be connected to the output shaft of a basic gearbox (not shown) in a heavy-duty vehicle, for example a truck or bus. The range gearbox comprises a planetary gear 4.

The output shaft of the basic gearbox forms the input shaft 2 of the range gearbox 1. The planetary gear 4 is arranged between the input shaft 2 of the range gearbox and an output shaft 3 from the range gearbox. The output shaft forms part of a transmission (not shown) which transmits driving power to the driving wheels of the vehicle. The driving power is therefore supplied from the engine of the vehicle, via the basic gearbox, the range gearbox and also via a further transmission (not shown), to the driving wheels. A sun gear 5, forming part of the planetary gear 4, with external teeth 6, is mounted in a rotationally fixed manner on the input shaft. In the illustrative embodiment shown, the sun gear is integrated in the shaft 2.

Alternatively, the sun gear can be attached to the shaft by means of splines. The sun gear is in engagement with a number of surrounding planet wheels 7 which are each mounted on their own pivot 8 in a planet-wheel carrier 9 which is in turn connected in a rotationally fixed manner to the output shaft 3. In the embodiment shown, the sun gear is also in rotationally fixed engagement with a first coupling ring 10 by means of internal teeth 11 on the coupling ring. The coupling ring 10 is arranged in a fixed manner relative to the sun gear in the axial direction and is provided with external coupling teeth 12. Arranged on the coupling ring 10 is an outward-facing conical friction surface 13a, the purpose of which is to interact with a corresponding inward-facing conical friction surface 13b on a synchronizing ring 14.

A second coupling ring 16 is arranged in a rotationally fixed manner and in a fixed manner in the axial direction relative to a gearbox casing 17 by means of, for example, external splines (not shown) arranged on the coupling ring 16 and also corresponding internal splines in the gearbox casing. Arranged on the coupling ring 16 is an inward-facing conical friction surface 23, the purpose of which is to interact with a corresponding outward-facing conical friction surface 22 on the synchronizing ring 15.

The planet wheels 7 are also in engagement with the internal teeth 19 of a ring gear 18. The ring gear 18 has on its external side, seen radially, a first circumferential groove 20 intended to receive an annular spring 21, the function of which spring is to transmit the pressing force from the ring gear to the synchronizing ring 15 when synchronization and shifting for low range take place.

Figure 5:
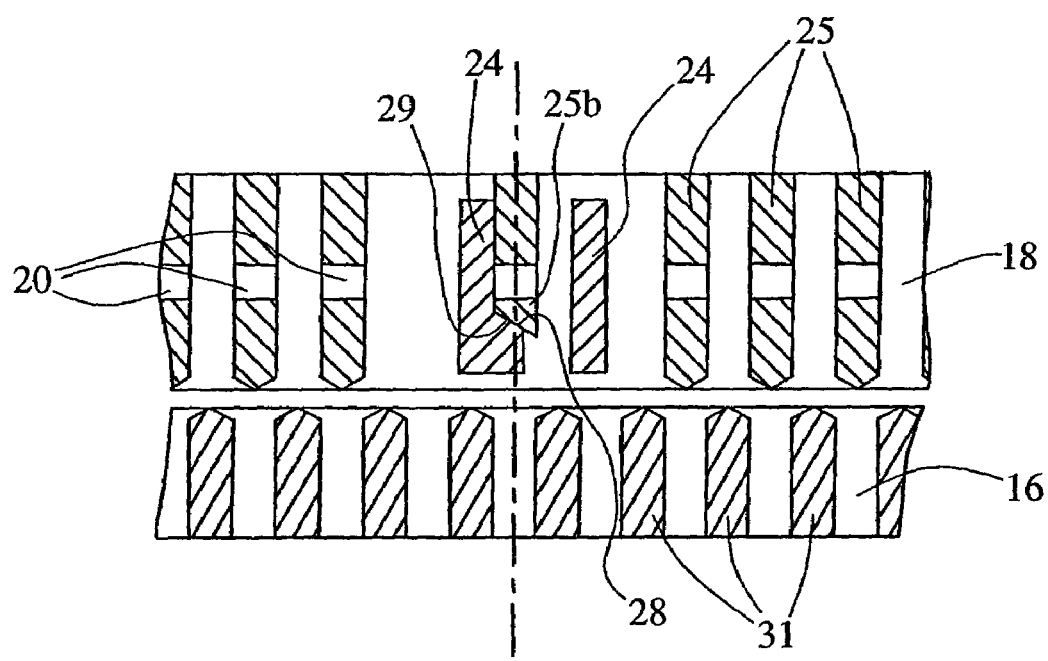
FIG. 5 shows diagrammatically external bars, blocking teeth and also respective sets of coupling teeth as prescribed in preferred embodiments of the instant invention.

Arranged on the external side (as seen radially) of the synchronizing ring 15 is a conical friction surface 22 which, when synchronization takes place, interacts with the conical friction surface 23 of the corresponding coupling ring 16. Arranged on the internal side, seen radially, of the synchronizing ring 15 are bars 24 which extend in the axial direction. The bars 24 are in engagement with corresponding external bars 25b on the ring gear 18. The bars 25b ensure that the synchronizing ring rotates with the ring gear 18, that is to say driving takes place. However, the synchronizing ring 15 is at the same time limitedly rotatable relative to the ring gear 18. This is shown by FIG. 5, where the external bar 25b of the ring gear 18 allows only a certain rotation of the synchronizing ring 15 by virtue of the fact that the bars 24 stop against the bar 25b. A suitable number of bars 25b along the circumference of the ring gear is six to nine. Other numbers are also possible.

The ring gear 18 is used as a coupling sleeve and is thus axially displaceable between a high-range mode and a low-range mode. This means that the ring gear 18 is axially displaceable relative to the synchronizing ring 15, the planet wheels 7 and the coupling rings 10 and 16. The synchronizing ring 15 is axially displaceable relative to the coupling ring 16.

FIG. 1 shows a range gear with the high-range gear engaged, that is to say the ring gear 18 is engaged so as to rotate with the input shaft 2. When the driver selects the low-range gear by means of a range selector (not shown), an axial force is transmitted in a known way to the ring gear 18, which makes it move to the right in FIG. 1. The displacement of the ring gear 18 takes place via means for displacement of the ring gear. In the illustrative embodiment shown, the means consists of a rod 26 which is coupled to the range selector and is in turn connected firmly to a fork 27.

The fork is connected rotatably to the ring gear 18 but is fixed in the axial direction relative to the ring gear 18.

The ring gear is first disengaged from the coupling teeth 12 of the coupling ring 10. The annular spring 21 accompanies the ring gear in its movement to the right in FIG. 1. The annular spring 21 is in a compressed, that is to say loaded, state on the bars 24 of the synchronizing ring 15. The dimensions of the first circumferential groove 20 are determined by the dimensions of the annular spring 21 so that it has space when it is in its compressed state. When the ring gear 18 moves to the right, it takes the synchronizing ring 15 with it by virtue of the straining of the annular spring against the internal bars 24 of the synchronizing ring.

When the ring gear 18 and the synchronizing ring 15 have moved sufficiently far to the right that the conical friction surface 22 comes into contact with the corresponding conical surface 23 on the coupling ring 16, the annular spring 21 is inserted into the groove 30 of the synchronizing ring 15, and synchronization of the speed difference between the ring gear 18 and the coupling ring 16 begins. The speed of the coupling ring 16 is zero as it is connected firmly to the gearbox casing 17. On account of the speed difference between the ring gear and the coupling ring, the braking torque, that is to say the synchronizing torque, will rotate the synchronizing ring relative to the ring gear as much as the spacing between the two bars 24 with blocking surface 28 allows (see FIG. 5). The magnitude of the synchronizing torque is determined by inter alia the diameter on which the friction surfaces 22 and 23 are located. A larger diameter provides a greater synchronizing torque for a given axial force from the ring gear 18.

Figure 4:
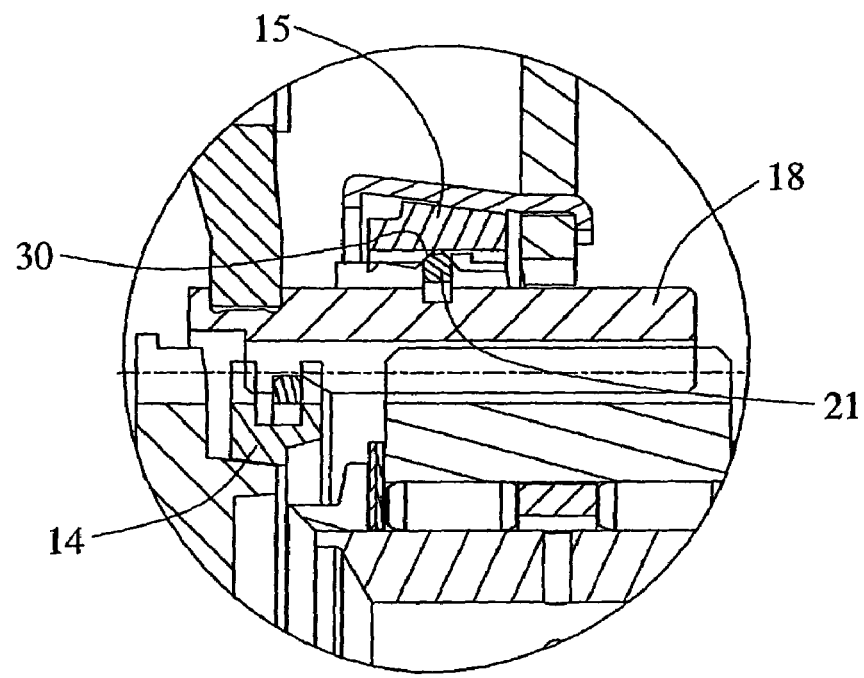
FIG. 4 shows an enlargement of part of the arrangement of FIG. 1, but in the phase of synchronization for low-range mode.

Blocking surfaces 28 are arranged on the synchronizing ring 15. In a known way, the limited rotation of the synchronizing ring 15 relative to the ring gear 18 and the blocking surfaces 28 on the synchronizing ring 15 and 29 on the bar 25*b* ensure that the ring gear 18 is blocked against further axial movement before synchronous speed has been achieved. FIG. 5 shows a situation just before synchronous speed has been achieved and the bars 25 of the ring gear are coupled together with the coupling teeth 31 on the coupling ring 16. When the blocking surfaces 28 block further displacement, the ring gear 18 and the annular spring 21 have been displaced relative to the synchronizing ring 15 into a position which is shown in FIG. 4.

Here, the annular spring 21 has taken up an expanded position in a second circumferential groove 30 arranged in the synchronizing ring 15.

Figure 3:
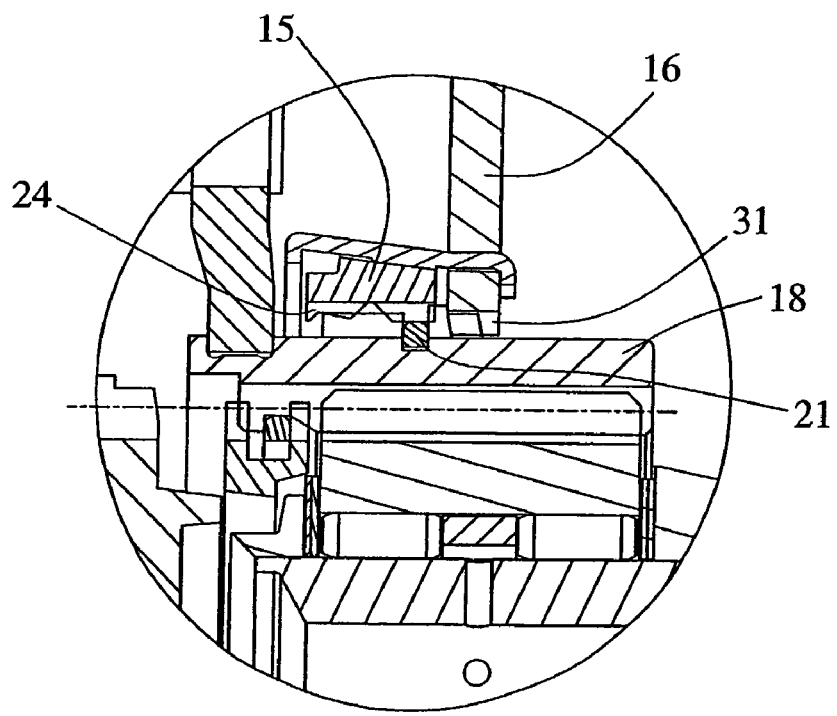
FIG. 3 shows an enlargement of part of the arrangement of FIG. 1, but with the low-range mode engaged.

During continued displacement of the ring gear 18, the annular spring 21 is compressed by interaction between the angled edge surfaces of the second circumferential groove 30 and the annular spring 21 and is finally displaced into a position part way up over the bars 24 (see FIG. 3). In this position, the synchronization work has been completed, and the ring gear 18 can be brought into engagement with the coupling teeth 31 of the coupling ring 16 in order to lock the ring gear 18 in relation to the gearbox casing 17.

The axial surfaces of the second groove 30 have an inclined angle adapted in order that the annular spring 21 will provide a certain presynchronizing force when axial movement of the ring gear 18 takes place. The annular spring can also have a corresponding angled edge surface. The inclination of the edge surfaces is adapted according to a previously known method to the synchronizing arrangement concerned so as to achieve optimum synchronization. It is also possible for the annular spring to be received by the second groove instead of the first. The first groove will then be provided with angled edge surfaces in a corresponding way, and the annular spring will jump in and out of the first groove instead in a corresponding way.

A corresponding procedure takes place when a high-range gear is engaged; that is to say, when the driver selects the high-range mode via a range selector (not shown), the ring gear 18 will, by actuation of the fork 27, be displaced to the left in FIG. 1. Synchronization of the speed takes place in a known way with the aid of the synchronizing ring 14 (see for example WO0155620).

The high-range mode is engaged when the internal teeth 19 (seen radially) of the ring gear 18 are in engagement with the external teeth 12 of the coupling ring 10.

The internal teeth 19 of the ring gear can be helical teeth, which can provide a servo effect when the concerned gear is engaged; that is to say, the moment of inertia in the gearbox helps to push the ring gear 18 in the axial direction. The external and internal bars on the ring gear and, respectively, the synchronizing ring and also the coupling teeth of the coupling rings can also be inclined in relation to the axial center line 32 of the ring gear. This means that when the range gear is engaged (low range or high range) balancing of the axial forces takes place. Balancing of the axial forces affords the advantage that the ring gear does not tend to move in the axial direction, and the fork 27 is thus not subjected to unnecessary stresses. The helical teeth moreover provide quieter operation.

The external bars on the ring gear and also the positioning of the low-range synchronizing ring 15 coaxially outside the ring gear contribute to the extremely short overall length of the gearbox casing and also to a greater synchronizing torque being obtained without the external shifting force, which is supplied via the rod 26 and the fork 27, having to be increased.

The invention is not limited to the gear arrangement described above. It is possible to use other types of resilient element instead of an annular spring.

In the illustrative embodiments shown, the friction surface 23 in the coupling ring 16 consists of a sheet-metal cone which is, by means of fingers, arranged firmly in corresponding holes in the coupling ring 16.

Alternatively the coupling ring 16 can be made with an integrated cone, which leads to a reduction in the number of component parts.

Alternatively, the coupling ring 10 can be connected firmly to the planet-wheel carrier 9 instead of the sun gear 5.

What is claimed is:

1. A range gearbox (1) for motor vehicles configured to be connected to an output side of a basic gearbox of the vehicle, said range gearbox (1) comprising:

an input shaft (2) from the basic gearbox, an output shaft (3) configured to be connected to a transmission of the vehicle, a planetary gear (4) arranged between the input shaft (2) and the output shaft (3), a ring gear (18) of the planetary gear (4) being axially displaceable by a first means (27) for axial displacement of the ring gear (18), a first coupling ring (10) that engages a high-range mode, and a second coupling ring (16) that engages a low-range mode, said coupling rings (10,16) and the ring gear (18) being alternatively engageable;

at least one synchronizing means (15) with at least one friction surface (22), said synchronizing means (15) configured to synchronize the rotational speed difference between the ring gear (18) and the second coupling ring (16) by interaction with a corresponding at least one friction surface (23) arranged on the second coupling ring (16); and said synchronizing means (15) and the second coupling ring (16) being arranged coaxially outside the ring gear (18), and at least one second means (25) for engaging at least the second coupling ring (16) and a third means (25, 25*b*) for driving said synchronizing means (15) being arranged on the external side, as seen radially, of the ring gear (18), and the synchronizing means (15) being arranged between the first means (27) and the second coupling ring (16).

2. The gearbox as recited in claim 1, wherein the second means (25) engage the first coupling ring (10).

3. The gearbox as recited in claim 1, wherein external bars on the ring gear (18) engage the first coupling ring (10).

4. The gearbox as recited in claim 1, wherein the second means (25) and the third means (25,25*b*) constitute a combined fourth means (25,25*b*) for driving said synchronizing means (15) and also for engaging at least the second coupling ring (16).

5. The gearbox as recited in claim 4, wherein the bars (25,25*b*) constitute at least one of (i) the second means (25), (ii) the third means (25,25*b*) and (interconnection) the fourth means (25,25*b*).

6. The gearbox as recited in claim 1, wherein at least one synchronizing ring (15) constitutes the synchronizing means (15).

7. The gearbox as recited in claim 1, wherein the ring gear (18) has on an external side thereof, as seen radially, at least one first circumferential groove (20).

8. The gearbox as recited in claim 7, wherein in the first groove (20), an essentially annular, radially resilient element (21) is arranged and which is moveable into and out of the first groove (20) when the ring gear (18) is displaced axially relative to the synchronizing means (15).

9. The gearbox as recited in claim 8, wherein the radially resilient element (21) is an annular spring (21) which has an interruption in a circumferential direction thereof.

10. The gearbox as recited in claim 7, wherein the synchronizing means (15) has on an internal side thereof, as seen radially, at least one second circumferential groove (30).

11. The gearbox as recited in claim 10, wherein in the second groove (30), an essentially annular, radially resilient element is arranged and which is moveable into and out of the second groove (30) when the ring gear (18) is displaced axially relative to the synchronizing means (15).

12. The gearbox as recited in claim 11, wherein the radially resilient element (21) is an annular spring (21) which has an interruption in a circumferential direction thereof.

13. The gearbox as recited in claim 1, further comprising:
a blocking surface (28) arranged on the synchronizing means (15) and which blocks engagement of the coupling ring (16) and the ring gear (18) before synchronous rotational speed is achieved.

14. The gearbox as recited in claim 1, wherein internal teeth (19) of the ring gear (18) are angled in a tangential plane in relation to the axial centerline (32) of the ring gear (18) for causing a servo effect when the axial movement of the ring gear (18) takes place.

15. The gearbox as recited in claim 5, wherein said bars (25) arranged on the external side of the ring gear (18) and coupling teeth (31) arranged on the coupling ring (16) are angled in a tangential plane in relation to the axial centerline (32) of the ring gear (18) for the purpose of balancing axial force acting on the ring gear when the internal teeth of the ring gear are angled.

16. A range gearbox (1) for motor vehicles configured to be connected to an output side of a basic gearbox of the vehicle, said range gearbox (1) comprising:
an input shaft (2) from the basic gearbox, an output shaft (3) configured to be connected to a transmission of the vehicle, a planetary gear (4) arranged between the input shaft (2) and the output shaft (3), and a ring gear (18) of the planetary gear (4) being axially displaceable by a first member (27);
a first coupling ring (10) configured to engage a high-range mode of the range gear box (1) and a second coupling ring (16) configured to engage a low-range mode of the range gear box (1);
at least one synchronizer (15) having at least one friction surface (22) and being configured to synchronize a rotational speed difference between the ring gear (18) and the second coupling ring (16) by interaction with a corresponding friction surface (23) arranged on the second coupling ring (16); and
said at least one synchronizer (15) and said second coupling ring (16) being arranged coaxially outside the ring gear (18), and at least one engagement arrangement (25) that engages at least the second coupling ring (16) and a engagement arrangement (25, 25b) for driving said synchronizer (15) and being arranged on the external side, as seen radially, of the ring gear (18), and the synchronizer (15) being arranged between the first member (27) and the second coupling ring (16).

* * * * *